United States Patent [19]

Maschmeier

[11] Patent Number: 4,901,444
[45] Date of Patent: Feb. 20, 1990

[54] METHOD AND APPARATUS FOR GUIDING A SAW RELATIVE TO AN ANGULAR CUT OF A BOARD

[76] Inventor: Frederick W. Maschmeier, 8555 Kugler Mill Rd., Cincinnati, Ohio 45243

[21] Appl. No.: 181,405

[22] Filed: Apr. 13, 1988

[51] Int. Cl.$^4$ .............................................. B43L 7/06
[52] U.S. Cl. ........................................ 33/423; 33/465; 33/426
[58] Field of Search ................. 33/423, 424, 418, 426, 33/417, 465, 471, 468, 469, 415, 416, 403, 421, 495, 497, 499, 500

[56] References Cited

U.S. PATENT DOCUMENTS

| | | | |
|---|---|---|---|
| 404,451 | 6/1889 | Waggoner | 33/500 X |
| 708,533 | 9/1902 | Cullmann | 33/423 |
| 745,271 | 11/1903 | Bones | 33/423 |
| 901,113 | 10/1908 | Losch | 33/498 |
| 936,157 | 10/1909 | Phenix | 33/471 |
| 1,331,415 | 2/1920 | Civitts | 33/471 |
| 1,535,042 | 4/1925 | Sadler . | |
| 2,001,654 | 5/1935 | Burrows . | |
| 2,316,189 | 4/1943 | Schaefer . | |
| 2,412,100 | 12/1946 | Smith . | |
| 2,549,950 | 4/1951 | Waton | 33/426 |
| 2,735,455 | 2/1956 | Forsberg . | |
| 2,823,709 | 2/1958 | Konieczka . | |
| 2,942,633 | 6/1960 | King . | |
| 4,202,233 | 5/1980 | Larson . | |
| 4,608,761 | 9/1986 | Small . | |

*Primary Examiner*—Harry N. Haroian
*Attorney, Agent, or Firm*—Wood, Herron & Evans

[57] ABSTRACT

A carpenter's protractor for use in scribing angled lines on a board or for guiding a portable saw in making angled cuts of a board. The protractor has an angularly adjustable arm which extends outwardly from opposite faces of the protractor body to enable the protractor to be used with either face of the protractor in engagement with the flat surface of a board and with either of a pair of opposed, parallel edges of the adjustable arm in engagement with a straight edge of the board.

2 Claims, 2 Drawing Sheets

METHOD AND APPARATUS FOR GUIDING A SAW RELATIVE TO AN ANGULAR CUT OF A BOARD

This invention relates to protractors, and more particularly to a carpenter's protractor of the type which is commonly used as an edge guide for hand-held power saw to cut varying angles with that saw.

A common problem encountered by carpenters or woodworkers in the cutting of angled surfaces of boards is that those angles often extend at an angle which is difficult to cut with an edge-guided, portable hand saw. One example of such a difficult to cut angle is an angle which extends away and to the left from the starting point of the cut on the board for a right-handed carpenter using a portable circular power saw. To make such a cut requires that the carpenter hold the protractor with his right hand and cut with the left—a very difficult task for a right-handed carpenter. The opposite is true for a left-handed carpenter, i.e., it is difficult to cut an angle away and to the right from the starting point of the cut on the board with an edge-guided circular power saw.

It has therefore been one objective of this invention to provide an improved protractor which will enable a right-handed carpenter to make any angled cut of a board by holding the carpenter's protractor in his left hand and holding the saw in his right hand while moving the saw away from him and to his right.

Still another objective of this invention has been to provide an improved carpenter's protractor which may be used more efficiently and more quickly than currently available commercial protractors to scribe or cut two different angles, as for example, an acute angle and the supplement of that angle, without resetting of the protractor.

To accomplish these objectives, the invention of this application comprises a carpenter's protractor which is reversible, i.e., may be located with either side face down against a board and with an angled arm of that board located adjacent one edge of the board. Because the protractor is reversible, it may always be oriented on a board sr as to locate the saw guide surface of the protractor in a position in which it extends away and to the right from the starting point of the cut for a right-handed carpenter or away and to the left in the case of a left-handed carpenter. If, when the protractor is initially oriented on the board, the saw guide surface of the protractor extends in the wrong direction, i.e., away and to the left for a right-handed carpenter, all that the carpenter need do with the invention of this application is to reverse the board, i.e., place the side which was up, down, and reverse the protractor, i.e., place the side which was up, down. This reversal of the board and of the protector results in a reorientation of the angle to be cut such that the angle which formerly extended away and to the left will now extend away and to the right relative to the carpenter.

The protractor of this invention which facilitates this reorientation or reversal of the protractor and board so as to achieve this objective comprises a base having a long, narrow, rectangular section from one edge of which there extends an arcuate section. Pivotally mounted on this arcuate section is a yoke-shaped arm, which arm extends over both sides of the arcuate section of the protractor and has a pair of opposed work guide surfaces located on both sides of the arcuate section. The arcuate section has conventional angular indicia on the face thereof, which indicia are used to position an indicator of the arm in a predetermined angular orientation of the arm relative to the arcuate section.

In the use of the protractor, the adjustable arm of the protractor is first adjusted to a predetermined angular setting relative to the arcuate section of the base. The arm is then locked in that angular setting. With the arm at that angular setting, the protractor is positioned on a board with one edge of the adjustable arm in juxtaposition to one edge of the board. With this location of the arm relative to the board, the edge of the base remote from the arcuate section is located at the predetermined angular setting of the arm relative to the edge against which the arm is resting. This edge of the base, which is at least 18 inches in length and preferably about 24 inches in length, may then be used as a guide surface for moving a portable saw over the surface of the board so as to cut the board at the predetermined angular setting. If, when the protractor is so positioned on the board, the angular setting runs away and to the left from the edge of the board against which the arm is in juxtaposition, the board may be turned over and the protractor turned over onto their respective opposite sides. When the protractor and board are so reversed, the arm may now be placed in juxtaposition to the opposite edge of the board against which the arm had formerly been resting, and the same angle on the board may now be cut by moving the saw away and to the right along the saw guide edge of the protractor.

The primary advantage of the carpenter's protractor of this invention is that it may be reversed and used with either side of the protractor resting against the top surface of a board while using the guide edge of the protractor as a guide edge for a saw. This reversibility enables the protractor to be used in the manner set forth hereinabove to make angled cuts of a board with greater ease than has heretofore been possible with carpenter's protractors which could only be utilized with one side of the protractor resting against the board to be cut utilizing the protractor as a guide.

Still another advantage of this protractor is that it may be used, without resetting the angle of the protractor, to cut or scribe an acute angle and the supplement of that angle. Such cuts are often made by carpenters when cutting boards, as for example, holding siding boards to cover the face of an A-frame building or angled roof section of a building.

These and other advantages of this invention will be more readily apparent from the following description of the drawings in which.

Figure 1:
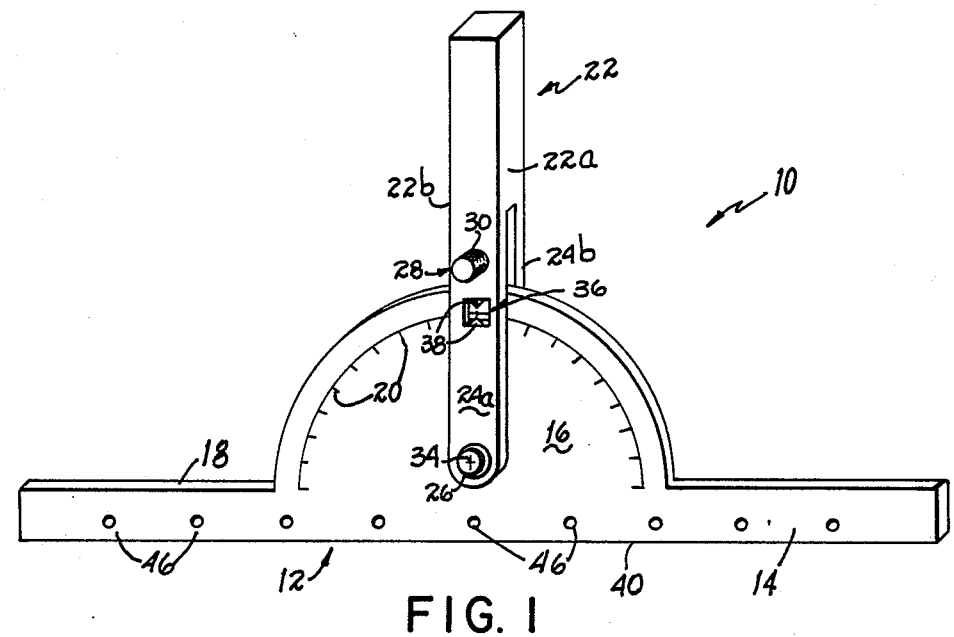
FIG. 1 is a perspective view of a carpenter's protractor incorporating the invention of this application.
Figure 2:
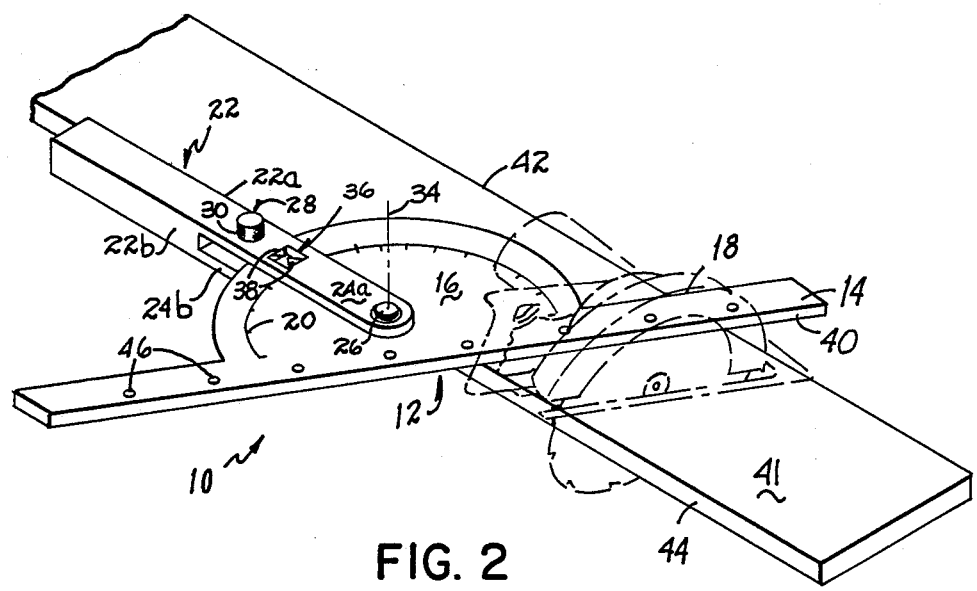
FIG. 2 is a perspective view of the protractor of FIG. 1 illustrating the manner of use of the protractor.
Figure 3A:
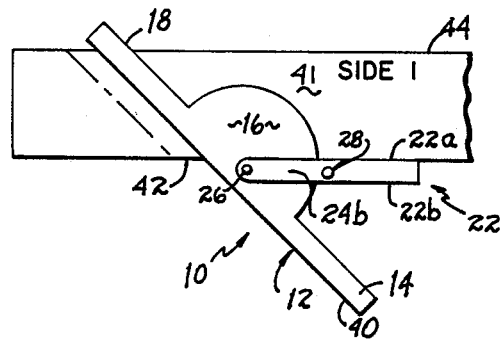
Figure 3B:
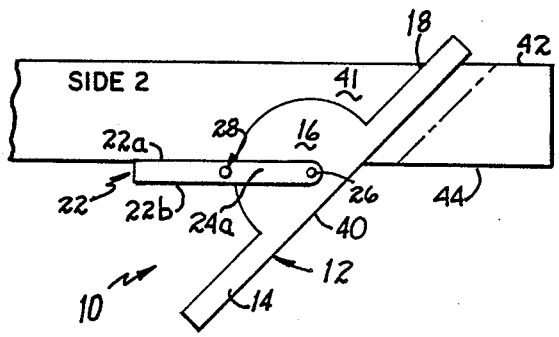
Figure 3C:
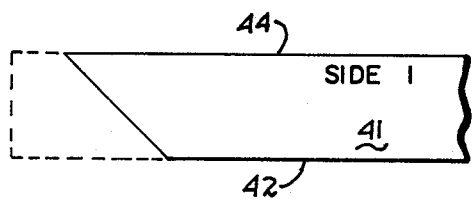

FIGS. 3a, 3b, and 3c are sequential illustrations of the manner of using the protractor of FIGS. 1 and 2 as a guide surface to cut a board at a particular angle after reversing the board and the protractor to establish the supplement of a desired angular orientation of the guide edge of the protractor relative to a guide edge of the board.

With reference first to FIGS. 1 and 2, it will be seen that the carpenter's protractor 10 of this invention comprises a base 12 having a long, narrow, rectangular base section 14 and an arcuate base section 16 extending from the center of one edge 18 of the rectangular base section 14. The arcuate base section 16 has angular indicia 20 thereon dividing the arcuate section of the protractor into divisions of a 180° arc or into divisions of two 90° arcs.

Pivotally mounted upon the base 14 there is a yoke-shaped movable arm 22. This arm has two fingers 24a, 24b located on opposite sides of the arcuate base section 16. One end of these fingers is pivotally attached to the arcuate section of the base 16 by a rivet or pivot shaft 26. The opposite end of the arm 22 remote from the pivot 26 is bifurcated and has a locking screw 28 extending therethrough. This locking screw has a knurled head 30 from which a threaded section extends through a smooth bored hole of one finger 24a into threaded engagement with a threaded hole in the opposite finger 24b. Alternatively, a wing nut may be threaded onto the end of the screw 28 remote from the knurled head 30. By tightening this screw 30, the bifurcated arm 22 may be clamped in a position of adjustment relative to the arcuate section of the base 16.

It is to be noted that the axis 34 of the rivet or pivot shaft 26 is located in the arcuate section 16 of the base above the plane of the edge 18 of the rectangular base section 14. This positioning of the axis 34 of the pivot 26 enables the arm to be adjusted for a full 180° of arcuate movement of the arm. If the pivot shaft 34 were located in the rectangular base section 14, the arm 22 would, of course, not be movable through a full 180° because of interference or contact of one edge of the arm with the edge 18 of the base before the arm could move through a full 180°.

Each finger 24a, 24b of the arm 22 has a window 36 formed therein. Located within this window there is an indicator 38 which facilitates positioning of the arm 22 at a predetermined angular setting of the protractor arm with the indicator 38 of the window located over an angular indicia 20 of the arcuate base section 16. Alignment of the indicator 38 with one of the indicia 20 of the protractor is clearly visible through the window 36.

While not illustrated in the drawings, the indicia 20 preferably exists on both sides of the arcuate base section 16 such that the arcuate setting of the arm may be viewed through a window 36 of either finger 24a or 24b.

In the use of the protractor and as illustrated in FIG. 2, the arm 22 of the protractor is first set at a predetermined angular setting of the protractor with the indicator 38 of an arm aligned with a particular angular indicia 20 of the base. The arm is then clamped in that position relative to the base by tightening of the screw 28. With the protractor so set, one of two opposed edges 22a, 22b of the arm 22 is placed in juxtaposition to one edge of a board. This results in the saw guide edge 40 of the protractor being located at the desired angular orientation of the guide edge relative to the edge of the board against which the edge 22a or 22b of the arm 22 is then located. The edge 40 of the base may then be utilized as a guide surface for a saw to cut the board at that desired angle relative to the edge of the board.

It is difficult for a carpenter to utilize a carpenter's protractor to make a cut moving a saw away and across the front of his body as the saw moves over a guide surface of a protractor. This is the type of movement which is required by a right-handed carpenter to make a cut utilizing the protractor 10 when positioned as illustrated in FIG. 3a. That same cut, though, may be made by reorienting the protractor and the board and without resetting of the protractor if the protractor is constructed as illustrated in FIGS. 1 and 2. Specifically, all that is required, and as illustrated in FIG. 3b, is to turn over the board 41 so that the side #1, which was formerly up, is now down against the supporting surface, and side #2, which was formerly resting against a supporting surface, is now exposed upwardly. Simultaneously, the protractor is reversed so that the side which had been formerly facing upwardly is now facing downwardly, or otherwise expressed, the side which had been resting against the board is now facing upwardly and the opposite side now rests against the board 41. With this reversal of the board and the protractor, the opposite edge of the arm 22 from the one which had formerly been juxtapositioned against the edge 42 of the board is now placed against a parallel edge 44 of the board. With this reversal of the board and the protractor and without changing the angular orientation of the arm 22 of the protractor relative to the base, the same angle which had formerly extended away and to the left of the carpenter now extends away and to the right relative to the carpenter. This angle may now be crt by moving a saw over the saw guide edge 40 of the base. After cutting of this angle from the board and as illustrated in FIG. 3c, when the board is again reversed so that the side which was up in FIG. 3a is again up, it will be seen that the angle which is cut by moving the saw away and to the right relative to the carpenter (as illustrated in FIG. 3b) now extends away and to the left relative to that same carpenter.

With reference to FIGS. 1 and 2 it will be noted that there are a plurality of equidistantly spaced holes 46 located along the length of the rectangular base section 14. These holes are preferably on the order of ⅛ of an inch in diameter and extend through the base section 14. These holes function as scribe holes to facilitate placement of a pencil or scribe in one of the holes such that when the protractor is moved linearly along one edge 42 or 44 of a board with one edge 22a or 22b of the arm in juxtaposition to the selected edge 42 or 44 of the board, a pencil within the hole will scribe a line on the board parallel to that edge. Because of the angular adjustability of the base section 14 of the protractor relative to the arm 22, such a parallel scribe line may be located anywhere on the surface of board.

The carpenter's protractor described hereinabove obviously is useful in the manner of any commercially available, non-reversible carpenter's protractor to scribe or cut angled boards. Additionally, though, it is, because of its reversibility, useful in the manner illustrated in FIGS. 3a-3c to cut angled boards without having to move the protractor guided saw across the body in front of the carpenter. This protractor, because of its reversibility, is also useful to scribe or cut an acute angle, as well as the supplement of that acute angle, without resetting the angle of the protractor.

While I have illustrated and described only a single preferred embodiment of my invention, persons skilled in the art to which this invention pertains will appreciate numerous changes and modifications which may be made without departing from the spirit of my invention. Therefore, I do not intend to be limited except by the scope of the following appended claims.

I claim:
1. A method of using a carpenter's protractor for guiding a saw relative to an angular cut of a board, which protractor comprises
   a base having a generally rectangular linear section and an arcuate section, said arcuate section extending from one edge of said rectangular linear sec- tion, said rectangular linear section having an edge opposite said one edge which is a straight edge, said base having a pair of opposed parallel faces, angular indicia on at least one face of said arcuate section of said base, a yoke-shaped arm mounted over said arcuate section of said base, said arm having a pair of fingers at one end, said fingers being located on opposite sides of said arcuate section of said base, said fingers being pivotally secured to said base, said arm having a pair of opposed straight edges, said arm having an end opposite said one end of said arm extending beyond said arcuate section of said base, and means for clamping said arm in an adjusted angular position relative to said arcuate section of said base such that either of said parallel falt faces of said base may be positioned in juxtaposition to a board with one straight edge of said arm in juxtaposition to an edge of said board, locating said arm at a predetermined angular setting of said arm relative to said arcuate section of said base, while maintaining said predetermined angular setting of said arm relative to said arcuate section of said base, positioning one face of said protractor against one face of said board with one straight edge of said arm in juxtaposition to one edge of said board and with said straight wedge of said rectangular linear section of said base angled at an angle other than a right angle relative to said one straight edge of said arm, and while maintaining said predetermined angular setting of said arm relative to said arcuate section of said base, repositioning said opposite face of said protractor against the opposite side of said board with one straight edge of said arm in juxtaposition to an edge of said board which is parallel and opposite said one edge of said board, and using said straight edge of said rectangular linear section of said base of said repositioned protractor as a guide surface for a saw to cut said board at said angle relative to said one edge of said board.

2. A method of using a carpenter's protractor for guiding a saw relative to an angular cut of a board, which protractor comprises a base having a generally rectangular linear section and an arcuate section, said arcuate section extending from one edge of said rectangular linear section, the opposite edge of said rectangular linear section being a straight edge, said base having a pair of opposed parallel faces, angular indicia on at least one face of said arcuate section of said base, ar arm having one yoke-shaped end mounted over said arcuate section of said base, said one yoke-shaped end of said arm having a pair of fingers located on opposite sides of said arcuate section of said base, said fingers being pivotally secured to said base, each of said fingers having a pair of opposed straight edges, said arm having an end opposite said one end of said arm extending beyond said arcuate section of said base, and means for clamping said arm in an adjusted angular position relative to said arcuate section of said base such that either of said parallel flat faces of said base may be portioned in juxtaposition to a board with one straight edge of said fingers of said arm in juxtaposition to an edge of said broad, which method comprises locating said arm at a predetermined angular setting of said arm relative to said arcuate section of said base, while maintaining said predetermined angular setting of said arm relative to said arcuate section of said base, positioning one face of said protractor against one face of said board with one straight edge of one of said fingers of said arm in juxtaposition to one edge of said board and with said straight edge of said rectangular linear section of said base angled at an angle other than a right angle relative to said one straight edge of one of said fingers, and while maintaining said predetermined angular setting of said arm relative to said arcuate section of said base, repositioning said opposite face of said protractor against the opposite side of said board with one straight edge of said fingers of said arm in juxtaposition to an edge of said board which is parallel and opposite said one edge of said board, using said straight edge of said rectangular linear section of said base of said repositioned protractor as a guide surface for a saw to cut said board at said angle relative to said one edge of said board.

* * * * *